(12) United States Patent
Nomura et al.

(10) Patent No.: US 10,789,118 B2
(45) Date of Patent: Sep. 29, 2020

(54) INFORMATION PROCESSING DEVICE AND ERROR DETECTION METHOD

(71) Applicant: NEC Corporation, Tokyo (JP)

(72) Inventors: Takashi Nomura, Tokyo (JP); Koji Kida, Tokyo (JP); Junpei Kamimura, Tokyo (JP); Yoshiaki Sakae, Tokyo (JP); Etsuko Katsuda, Tokyo (JP); Kazuhiko Isoyama, Tokyo (JP); Kentaro Yamasaki, Tokyo (JP); Yuji Kobayashi, Tokyo (JP)

(73) Assignee: NEC Corporation, Tokyo (JP)

(*) Notice: Subject to any disclaimer, the term of this patent is extended or adjusted under 35 U.S.C. 154(b) by 72 days.

(21) Appl. No.: 15/127,354

(22) PCT Filed: Mar. 18, 2015

(86) PCT No.: PCT/JP2015/001500
§ 371 (c)(1),
(2) Date: Sep. 19, 2016

(87) PCT Pub. No.: WO2015/141221
PCT Pub. Date: Sep. 24, 2015

(65) Prior Publication Data
US 2017/0132060 A1    May 11, 2017

(30) Foreign Application Priority Data

Mar. 20, 2014  (JP) .................................. 2014-058497
Jun. 5, 2014   (WO) .................. PCT/JP2014/003007

(51) Int. Cl.
*G06F 11/00*   (2006.01)
*G06F 11/07*   (2006.01)
(Continued)

(52) U.S. Cl.
CPC ........ *G06F 11/079* (2013.01); *G06F 11/0718* (2013.01); *G06F 11/0751* (2013.01);
(Continued)

(58) Field of Classification Search
CPC ............... G06F 11/079; G06F 11/0718; G06F 11/0751; G06F 11/0772; G06F 11/0787;
(Continued)

(56) References Cited

U.S. PATENT DOCUMENTS 6,141,633 A * 10/2000 Iwashita ............... G06F 17/504
                                                                  703/15
7,822,850 B1 * 10/2010 Brikman ................ G06F 16/84
                                                                  709/224
(Continued)

FOREIGN PATENT DOCUMENTS

CA        2713736 A1    8/2009
CN      101083557 A    12/2007
(Continued)

OTHER PUBLICATIONS

Extended European Search Report issued by the European Patent Office for European Application No. 15765705.7 dated Nov. 2, 2017 (10 pages).

(Continued)

*Primary Examiner* — Katherine Lin
(74) *Attorney, Agent, or Firm* — Wilmer Cutler Pickering Hale and Dorr LLP

(57) ABSTRACT

The present invention provides an information processing device that improves the detectability of system errors. This information processing device includes: a means that generates a state graph based on relationship change information indicating a change in the relationship between a plurality of elements included in a system, the state graph having the elements as the vertices thereof and the relation- (Continued)

ship between the elements as the sides thereof; a means that generates a normal model having the state graph as a set of conditions to be fulfilled during normal system operation, based on the relationship change information; and a means that detects system errors and outputs error information indicating detected errors, based on the state graph and the normal model.

13 Claims, 17 Drawing Sheets

(51) Int. Cl.
*G06F 11/34* (2006.01)
*G06F 11/30* (2006.01)
*H04L 12/24* (2006.01)

(52) U.S. Cl.
CPC ...... *G06F 11/0772* (2013.01); *G06F 11/0787* (2013.01); *G06F 11/302* (2013.01); *G06F 11/3017* (2013.01); *G06F 11/3079* (2013.01); *G06F 11/3086* (2013.01); *G06F 11/3447* (2013.01); *H04L 41/0631* (2013.01); *H04L 41/0677* (2013.01); *G06F 2201/81* (2013.01)

(58) Field of Classification Search
CPC ............... G06F 11/302; G06F 11/3079; G06F 11/3086; G06F 11/3447
See application file for complete search history.

(56) References Cited

U.S. PATENT DOCUMENTS

| | | | |
|---|---|---|---|
| 2002/0040337 A1* | 4/2002 | Kikuchi | G06Q 10/06 705/36 R |
| 2010/0205483 A1 | 8/2010 | Ishiou | |
| 2011/0087924 A1 | 4/2011 | Kandula et al. | |
| 2012/0260236 A1 | 10/2012 | Basak et al. | |
| 2013/0097183 A1 | 4/2013 | McCracken | |
| 2014/0006330 A1* | 1/2014 | Biem | G06F 11/0751 706/46 |
| 2014/0093019 A1* | 4/2014 | Oehler | H04B 1/71637 375/343 |

FOREIGN PATENT DOCUMENTS

| | | |
|---|---|---|
| CN | 102449635 A | 5/2012 |
| EP | 2508997 A1 | 10/2012 |
| JP | 2008-021274 A | 1/2008 |
| JP | 2010-128673 A | 6/2010 |
| JP | 2012-523159 A | 9/2012 |
| JP | 2012-221502 A | 11/2012 |
| WO | WO-2009/097435 A1 | 8/2009 |
| WO | WO-2013/055760 A1 | 4/2013 |

OTHER PUBLICATIONS

International Search Report and Written Opinion issued by the Japan Patent Office as International Searching Authority for International Application No. PCT/JP2014/003007 dated Sep. 2, 2014 (8 pages).
International Search Report corresponding to PCT/JP2015/001500, dated Jun. 16, 2015, 2 pages.
Written Opinion of the International Search Authority with English Translation corresponding to PCT/JP2015/001500, dated Jun. 16, 2015, 6 pages.
Osamu Akashi, et al., "IM-VIS: Inter-domain network-status visualization system based on information integration", IPSJ SIG Notes, Information Processing Society of Japan, vol. 2009, No. 6, Jan. 21, 2009, pp. 75-82, ISSN: 0919-6072.
Chinese Office Action issued by the State Intellectual Property Office of People's Republic of China for Chinese Application No. 201580015248.8 dated Mar. 23, 2018 (15 pages).
Japan Notice of Reasons for Refusal issued in Japanese Patent Application No. 2016-508539, dated May 7, 2019, 5 pages.

* cited by examiner

811   RELATIONSHIP CHANGE INFORMATION

| "L2" OCCURRED BETWEEN "E2" AND "E3" |

821 STATE GRAPH

| VERTEX IDENTIFIER | SIDE |
|---|---|
| E1 | E2;L0、 E3;L1;L1 |
| E2 | E1;L0、 E3;L2 |
| E3 | E1;L1;L1、 E2;L2 |
| E4 |  |

831 NORMAL MODEL

| TYPE OF CONDITION | CONDITION VALUE | VALID FLAG |
|---|---|---|
| NUMBER OF RELATIONSHIP VERTICES | UPPER LIMIT 2 | VALID |
| ORDER | UPPER LIMIT 6 | VALID |
| SIDE ATTRIBUTE | | INVALID |

841 ERROR INFORMATION

| NUMBER OF RELATIONSHIP VERTICES HAS EXCEEDED ITS UPPER LIMIT |
|---|

811 RELATIONSHIP CHANGE INFORMATION

"L0" HAS OCCURRED BETWEEN "E3" AND "E4"

821 STATE GRAPH

| VERTEX IDENTIFIER | SIDE |
|---|---|
| E1 | E2;L0,  E3;L1;L1 |
| E2 | E1;L0,  E3;L2 |
| E3 | E1;L1;L1、 E2;L2、 E4;L0 |
| E4 | E3;L0 |

842 ERROR INFORMATION

NUMBER OF RELATIONSHIP VERTICES HAS EXCEEDED ITS UPPER LIMIT BY 50%

843 ERROR INFORMATION

NUMBER OF RELATIONSHIP VERTICES ("E1," "E2," AND "E4")
HAS EXCEEDED ITS UPPER LIMIT IN "E3"

845 ERROR INFORMATION

|    | E1 | E2 | E3 | E4 |
|----|----|----|----|----|
| E1 | NL | L0 | L1 | NL |
| E2 | NL | NL | NL | NL |
| E3 | L1 | L2 | NL | L0 |
| E4 | NL | NL | NL | NL |

INFORMATION PROCESSING DEVICE AND ERROR DETECTION METHOD

CROSS-REFERENCE TO RELATED APPLICATIONS

This application is a national stage application of International Application No. PCT/JP2015/001500 entitled "INFORMATION PROCESSING DEVICE AND ERROR DETECTION METHOD," filed on Mar. 18, 2015, which claims the benefit of the priority of PCT/JP2014/003007 filed on Jun. 5, 2014 and Japanese Patent Application No. 2014-058497 filed on Mar. 20, 2014, the disclosures of each of which are hereby incorporated by reference in their entirety.

TECHNICAL FIELD

The present invention relates to a technique for detecting system errors.

BACKGROUND ART

Various related-art techniques are known to detect system errors.

For example, PTL 1 discloses a process monitoring device. The process monitoring device disclosed in PTL 1 operates in the following way.

First, the process monitoring device extracts an attention-requiring process based on static attributes for the process. Examples of the static attributes include a process name, a manufacturer's name of a program for implementing the process, the program (software) name, a version, a name of a parent process that activates the process, and a process size. The process monitoring device extracts a relevant process as the attention-requiring process when current static attributes are different from past static attributes. The process monitoring device extracts the relevant process as the attention-requiring process when the past static attributes are unavailable. The process monitoring device extracts the relevant process as the attention-requiring process when a parent process is unidentifiable. The process monitoring device extracts the relevant process as the attention-requiring process when an external process serves as a parent process Second, the process monitoring device issues an alarm for the attention-requiring process based on the dynamic attributes. Examples of the dynamic attributes include the number of dynamic dedicated memory bytes, the number of dynamic shared memory bytes, redirector sending, the reception traffic rate, and the hard disk access rate. When the past dynamic attributes may be discriminated from the current dynamic attributes by using any statistical method, the process monitoring device, for example, generates an alarm for the relevant attention-requiring process or registers it as a process to be monitored.

Third, the process monitoring device extracts an associated process having a predetermined relevance to the attention-requiring process and determines the associated process as a process to be monitored. Examples of the process having the predetermined relevance include a process having a specific parent-child relation, and a process always activated when the process to be monitored operates, although not having a specific parent-child relation.

PTL 2 discloses a technique associated with the use of cloud computing in a security application. A system disclosed in PTL 2 operates in the following way.

First, the system monitors the traffic of a client.

Second, the system compares the monitored traffic with a predicted traffic pattern corresponding to the operation mode of the client.

Third, the system determines whether a security threat has been found, based on the comparison result.

CITATION LIST

Patent Literature

[PTL 1] Japanese Unexamined Patent Application Publication No. 2008-021274

[PTL 2] Japanese Unexamined Patent Application Publication (Translation of PCT International Application) No. 2012-523159

SUMMARY OF INVENTION

Technical Problem

However, in the above-described techniques disclosed in Citation List, errors for each individual element or errors resulting from predefined attack patterns are merely detected. In other words, it is difficult to detect, for example, errors resulting from unknown target-type attacks against a computer system.

This is because the technique disclosed in PTL 1 is used to simply detect errors based on predefined static and dynamic attributes for individual processes. The technique disclosed in PTL 1 merely takes the synchrony between the parent-child relationship and activation into consideration in relevant process extraction.

The technique disclosed in PTL 2 is used to simply detect errors in the traffic of the client based on the predicted traffic patterns.

An object of the present invention is to provide an information processing device, a monitoring method, and a program therefor or a non-transitory computer-readable recording medium recording the program to solve the above-mentioned problem.

Solution to Problem

An information processing device according to one aspect of the present invention includes: graphing means for obtaining relationship change information indicating a change in a relationship between a plurality of elements included in a system on a time-series basis and for generating a state graph based on the relationship change information, the state graph including the elements as vertices thereof and the relationship between the elements as sides thereof; normal model generation means for generating a normal model including the state graph as a set of conditions to be fulfilled during normal operation of the system based on the relationship change information; and error detection means for detecting an error associated with the system based on the state graph and the normal model and outputting first error information indicating the detected error.

An error detection method according to one aspect of the present invention includes: obtaining relationship change information indicating a change in a relationship between a plurality of elements included in a system on a time-series basis and generating a state graph based on the relationship change information, the state graph including the elements as vertices thereof and the relationship between the elements as sides thereof; generating a normal model including the state graph as a set of conditions to be fulfilled during normal operation of the system based on the relationship change information; detecting an error associated with the system based on the state graph and the normal model; and outputting error information indicating the detected error.

A non-transitory computer-readable recording medium according to one aspect of the present invention records a program for causing a computer to execute the processes of: obtaining relationship change information indicating a change in a relationship between a plurality of elements included in a system on a time-series basis and generating a state graph based on the relationship change information, the state graph including the elements as vertices thereof and the relationship between the elements as sides thereof; generating a normal model including the state graph as a set of conditions to be fulfilled during normal operation of the system based on the relationship change information; detecting an error associated with the system based on the state graph and the normal model; and outputting error information indicating the detected error.

Advantageous Effects of Invention

The present invention may improve the detectability of system errors.

DESCRIPTION OF EMBODIMENTS

Figure 1:
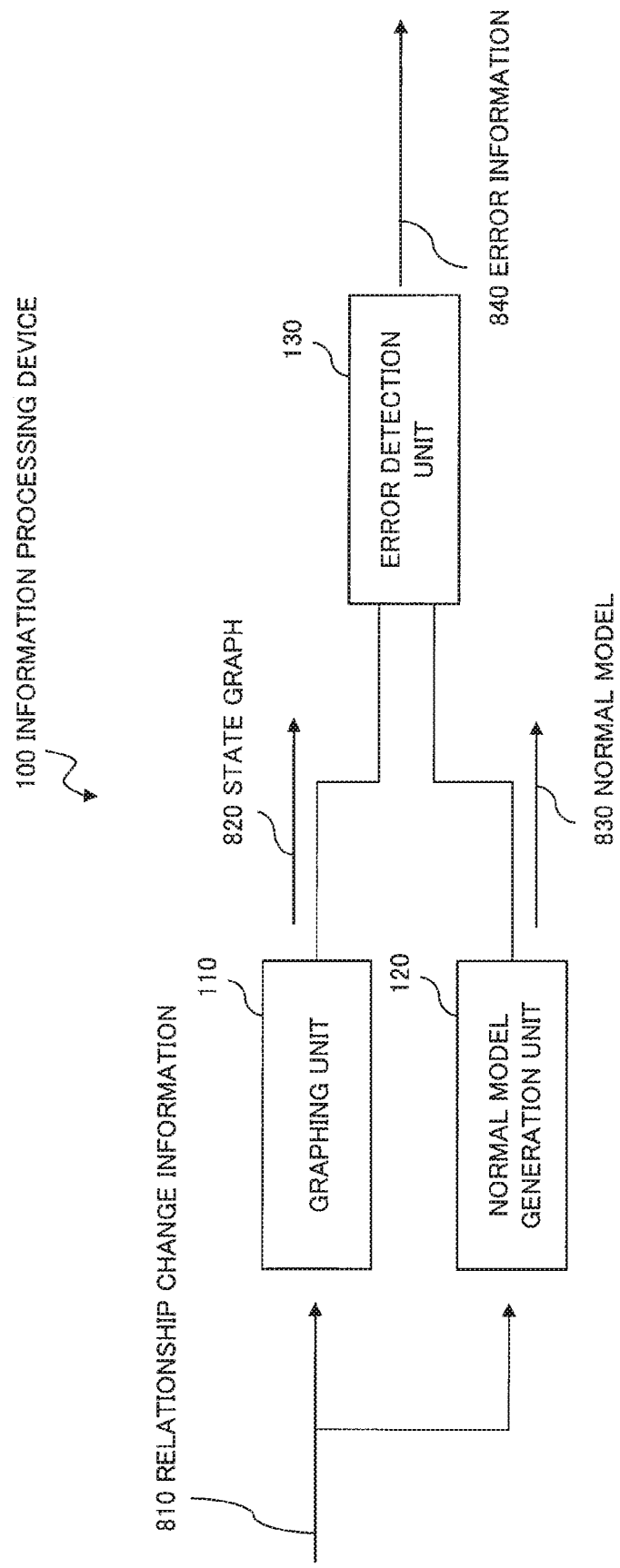
FIG. 1 is a block diagram illustrating the configuration of an information processing device according to a first exemplary embodiment of the present invention.

Exemplary embodiments of the present invention will be described in detail below with reference to the drawings. In each drawing and each exemplary embodiment described in the present description, the same reference numerals denote the same components, and a description thereof will not be given as appropriate.

First Exemplary Embodiment

FIG. 1 is a block diagram illustrating the configuration of an information processing device 100 according to a first exemplary embodiment of the present invention.

The information processing device 100 according to the present exemplary embodiment includes a graphing unit 110, a normal model generation unit 120, and an error detection unit 130, as illustrated in FIG. 1. Components illustrated in FIG. 1 may be divided for each hardware-specific circuit or each function of a computer device. Components illustrated in FIG. 1 are assumed herein to be divided for each function of a computer device.

Figure 2:
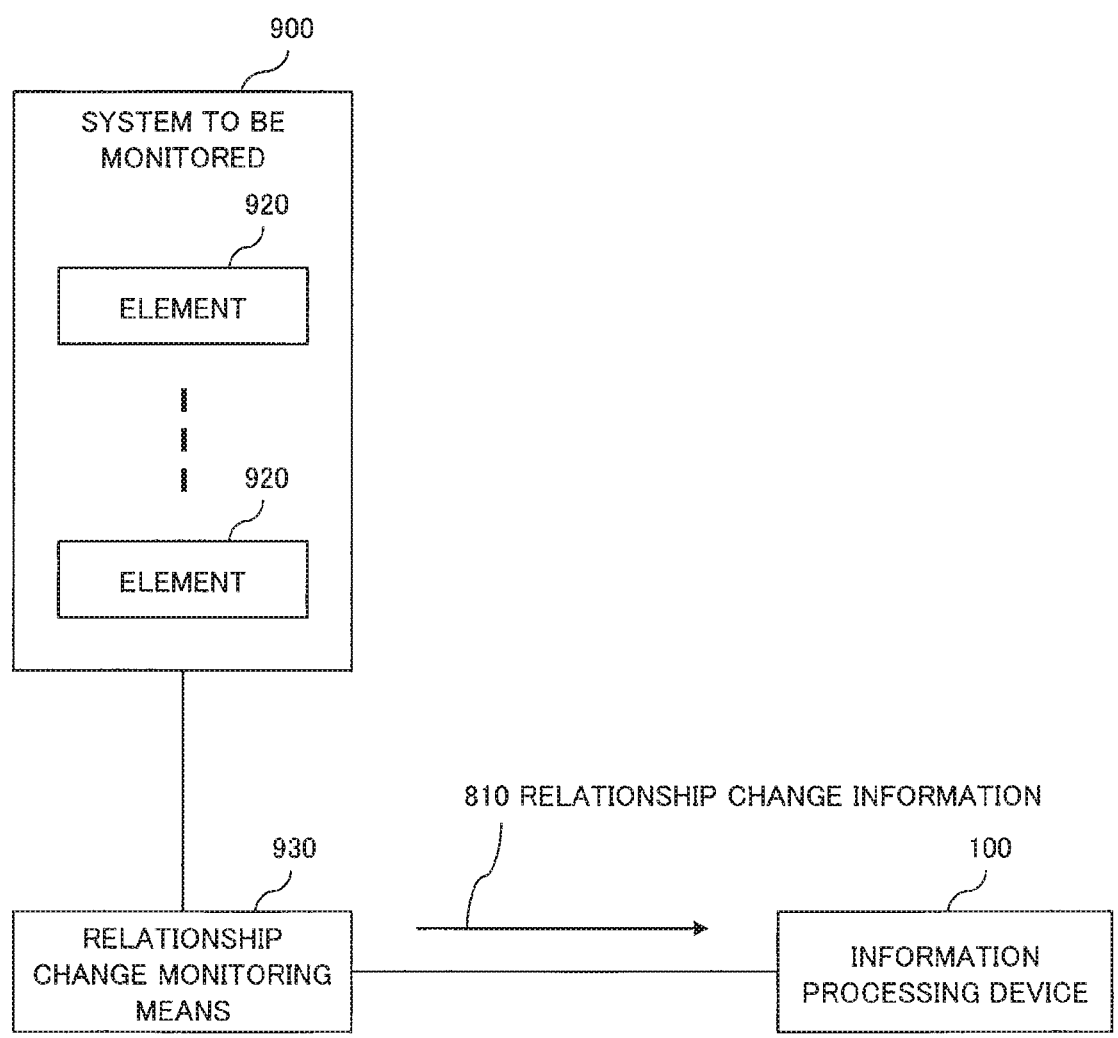
FIG. 2 is a block diagram illustrating the configuration of an information processing system including the information processing device and a system to be monitored according to the first exemplary embodiment.

FIG. 2 is a block diagram illustrating the configuration of an information processing system including the information processing device 100, a system to be monitored (to be also simply referred to as a "system" hereinafter) 900, and a relationship change monitoring means 930.

===System to be Monitored 900===

The system to be monitored 900 includes a plurality of elements 920. Each element 920 has certain relationships with other respective elements 920.

For example, the system to be monitored 900 is an information processing system which includes a plurality of hosts (not illustrated) connected to each other via a network and activates processes (not illustrated) on the hosts.

The system to be monitored 900 may be a social network.

The system to be monitored 900 may be a set of data items (elements 920) having a certain structure. Examples of the set of data items having a certain structure include a set of files having the relationship between hyperlinks and hyperlinked objects.

The system to be monitored 900 may be any system regardless of the above-mentioned examples.

===Relationship Change Monitoring Means 930===

The relationship change monitoring means 930 monitors changes in relationship between the elements 920 included in the system to be monitored 900. The relationship change monitoring means 930 sends the detected changes in relationship to the information processing device 100 as relationship change information 810. The relationship change monitoring means 930 may be included in the system to be monitored 900.

When the system to be monitored 900 is an information processing system, the relationship change monitoring means 930 may be, for example, an agent running on a host. For example, the agent monitors the behavior of processing activated on the host and sends a processing event log to the information processing device 100.

When the system to be monitored 900 is a social network, the relationship change monitoring means 930 may serve as, for example, a mail monitoring agent running on a mail server. The social network means herein a network constructed by SNS (Social Networking Service). For example, the mail monitoring agent monitors mail messages exchanged among users and sends a mail transmission and reception log to the information processing device 100. Alternatively, the relationship change monitoring means 930 may be an agent running on an SNS server. The agent monitors, for example, friend request information (message information) and links between friends (user connection information/increase in number of links) in SNS, and their changes.

When the system to be monitored 900 is a set of web pages, the relationship change monitoring means 930 may be, for example, an agent running on a web server. For example, the agent monitors creation and deletion of web pages and changes in hyperlink relationship between the web pages and sends an event log indicating details of the changes to the information processing device 100.

The relationship change monitoring means 930 may monitor changes in relationship between arbitrary elements 920 in an arbitrary system and send arbitrary relationship change information 810 to the information processing device 100, regardless of the above-mentioned examples.

The information processing device 100 and the relationship change monitoring means 930 are connected to each other via a network (not illustrated). A plurality of relationship change monitoring means 930 for monitoring the identical or different systems to be monitored 900 may be connected to the information processing device 100 without limitation to the example illustrated in FIG. 2.

===Graphing Unit 110 of Information Processing Device 100===

The graphing unit 110 acquires relationship change information 810 of the system to be monitored 900 on a time-series basis from, for example, the relationship change monitoring means 930. The graphing unit 110 generates a state graph 820 based on the relationship change information 810 which is obtained and outputs the state graph 820 to the error detection unit 130.

===Relationship Change Information 810===

The relationship change information 810 is information indicating changes in relationship between the elements 920 included in the system to be monitored 900. More specifically, the relationship change information 810 includes pieces of information sent from various relationship change monitoring means 930, as described above.

Figure 3:
FIG. 3 is a view illustrating exemplary relationship change information in the first exemplary embodiment.

FIG. 3 is a view illustrating exemplary relationship change information 811 as a specific example of the relationship change information 810. The relationship change information 811 illustrated in FIG. 3 indicates an event "a relationship of type "L2" occurred between an element 920 "E2" and an element 920 "E3."" Note that "E2" and "E3" are identifiers for the elements 920. For example, the element 920 "E2" indicates an element 920 having the identifier "E2." Further, "L2" is an identifier for the type of relationship between the elements 920. For example, the type "L2" indicates a type of relationship between the elements 920, having the identifier "L2."

===State Graph 820===

The state graph 820 has each element 920 as its vertex (also called a node or a node point) and the relationships between the elements 920 as its sides (also called links, edges, or branches). The state graph 820 represents the relationship between the elements 920 in the system to be monitored 900. Examples of this relationship include herein a data transmission relationship "data is transmitted between elements during a certain period," and a data transmission relationship "data transmission may take place between elements at a certain moment (or during a certain period)."

Figure 4:
FIG. 4 is a view illustrating an exemplary state graph in the first exemplary embodiment.

FIG. 4 is a view illustrating a state graph 821 as a specific example of the state graph 820. The state graph 821 is defined by a record including vertex identifiers and sides, as illustrated in FIG. 4. The vertex identifiers are identifiers for elements 920 forming vertices. The side is information indicating the relationships between a vertex (element 920) specified by each vertex identifier and other vertices (elements 920).

For example, the vertex identifier "E1" specifies an element 920 having the identifier "E1." The side "E2; L0, E3; L1; L1" corresponding to the vertex identifier"E1" indicates the following information. First, the element 920 "E1" has a side formed with the element 920 "E2" and having the attribute "L0." Second, the element 920 "E1" has two sides formed with the element 920 "E3" and both having the attribute "L1."

For example, in a record having the vertex identifier "E4," the Side field is blank, and this indicates that the element 920 "E4" has no side formed with any remaining element 920.

A side indicates, for example, that elements 920 having the side have completed their preparation for communication. The attribute of a side indicates, for example, the type of protocol of communication performed on the side. A side and the attribute (for example, the type) of the side, for example, may be defined in any form indicating the relationship between the elements 920, without limitation to the above-mentioned examples.

For example, the side "E3; L2" in a record having the vertex identifier "E2" and the side "E2; L2" in a record having the vertex identifier "E3" are defined on the basis of the relationship change information 811 illustrated in FIG. 3.

The state graph 820 may take any form without limitation to the above-mentioned examples.

===Relationship Between Elements 920 Represented by State Graph 820===

Figure 5:
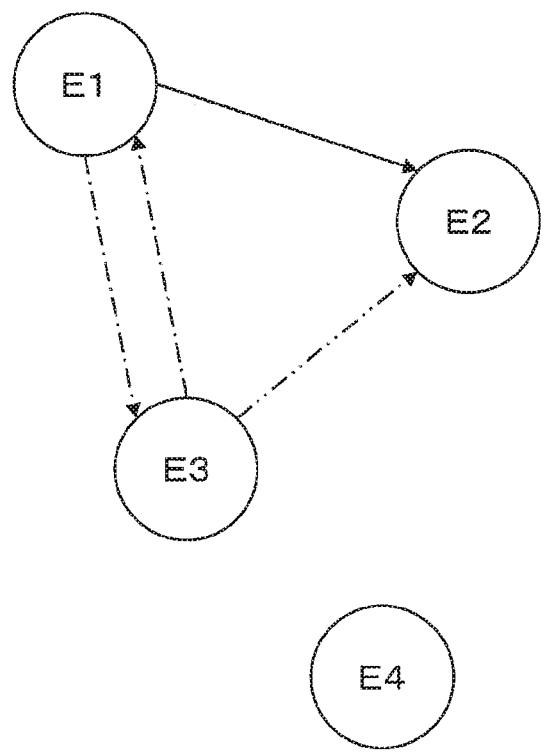
FIG. 5 is a conceptual view illustrating the relationship between elements represented by the state graph in the first exemplary embodiment.

FIG. 5 is a conceptual view illustrating the relationship between the elements 920 represented by the state graph 821.

Referring to FIG. 5, vertices are represented in circles and vertex identifiers are marked within the circles. Sides are represented by line segments which connect the circles to each other. For example, a solid segment indicates a side having the type "L0." Line segments indicated by alternate long and short dashed lines indicate sides having the type "L1." A segment indicated by an alternate long and two short dashed line indicates a side having the type "L2." Arrows indicate the outward direction from the relationship generation side.

===Normal Model Generation Unit 120 of Information Processing Device 100===

The normal model generation unit 120 generates a normal model 830 based on the relationship change information 810 and outputs the normal model 830 to the error detection unit 130. The normal model 830 is a set of conditions which the state graph 820 fulfills during the normal operation of the system to be monitored 900.

===Normal Model 830===

Figure 6:
FIG. 6 is a view illustrating an exemplary normal model in the first exemplary embodiment.

FIG. 6 is a view illustrating an exemplary normal model 831 as a specific example of the normal model 830. The normal model 831 is defined by a record including the type of condition, the condition value, and the valid flag, as illustrated in FIG. 6.

For example, the condition value "Upper Limit 2" in a record having the type of condition "Number of Relationship Vertices" indicates the condition "the number of elements 920 having sides formed with one vertex (element 920) is two or less." The condition value "Upper Limit 6" in a record having the type of condition "Order" indicates the condition "the number of sides extending from one vertex is six or less." A record having the type of condition "Side Attribute" indicates the condition for the attribute of a side (for example, the type of relationship, the frequency, the superior-to-subordinate direction of a relationship, the time at which a relationship has occurred, or the like). The valid flag indicates whether the condition value included in the record is valid. The initial value of the valid flag is "invalid."

The normal model generation unit 120 may, for example, set as a condition value for a record having the type of condition "Number of Relationship Vertices," the value obtained by adding a predetermined value to the average of "Numbers of Relationship Vertices" for each of all vertices during a predetermined period. The predetermined period is defined as, for example, the period (to be referred to as a period Pa hereinafter) from a specific past time until the current time. The predetermined period may also be the period (to be referred to as a period Pb hereinafter) defined by a specific duration preceding the current time. The predetermined period may even be the period (to be referred to as a period Pc hereinafter) from a specific first past time until a specific second past time. The predetermined period may even be the period taken to obtain a predetermined number of pieces of relationship change information 810. In other words, the predetermined period may be the period (to be referred to as a period Pd (with respect to the current time) or a period Pe (with respect to the past time) hereinafter) which is recent with respect to the current time or specific past time and during which a predetermined number of pieces of relationship change information 810 are obtained. The predetermined period may even be a predetermined intermittent period during the period Pa, Pb, Pc, or Pd. The normal model generation unit 120 may generate the normal model 830 on the basis of relationship change information 810 during an arbitrary period such as past fixed periods (periods Pc and Pe) or sequentially-varying periods (periods Pa, Pb, and Pd), as described above. When the normal model generation unit 120 generates the normal model 830 based on the relationship change information 810 during a sequentially-varying period, the normal model 830 is sequentially updated in accordance with the sequential input of the relationship change information 810.

The normal model generation unit 120 may calculate a condition value for an arbitrary type of condition, using any technique based on the relationship change information 810, without limitation to the above-mentioned example.

The normal model generation unit 120 sets the valid flag "Valid" when a condition value is generated or updated, for example, based on a predetermined number of pieces of relationship change information 810. The normal model generation unit 120 may also set the valid flag "Valid" when a condition value is generated or updated based on relationship change information 810 during a predetermined period.

The normal model 830 may include records representing the following types of conditions regardless of the above-mentioned example.

The normal model 830 may include a record representing conditions for the attributes of a vertex (for example, the type of element 920, the time at which the vertex has occurred, or the like).

The normal model 830 may include a record representing conditions for the attributes of adjacent vertices.

The normal model 830 may include a record representing arbitrary conditions for the presence or absence, the number, and the distance of paths between vertices, the attributes of vertices and sides in the routes, and the like.

The normal model 830 may even include a record representing conditions for graph characteristics (for example, the diameter, centricity, substructure, or the like).

===Error Detection Unit 130 of Information Processing Device 100===

The error detection unit 130 detects an error associated with the system to be monitored 900 based on the state graph 820 and the normal model 830 and outputs error information 840 indicating the detected error.

The error information 840 indicates, for example, that any error of the system to be monitored 900 has been detected. The error information 840 may further include arbitrary information associated with the error.

The error detection unit 130 may output the error information 840 at any timing. For example, the error detection unit 130 outputs error information 840 indicating an error, upon detecting the error. The error detection unit 130 may also hold the detected error and output error information 840 indicating the held error in response to a request (a predetermined time of day or an instruction by the administrator). The error detection unit 130 may even detect an error for the state graph 820 corresponding to the time of day (time range) included in the request.

Figure 7:
FIG. 7 is a view illustrating exemplary error information in the first exemplary embodiment.

FIG. 7 is a view illustrating exemplary error information 841 as a specific example of the error information 840. The error information 841 indicates that the number of relationship vertices has exceeded its upper limit, as illustrated in FIG. 7.

Function-specific components of the information processing device 100 have been described above.

Next, Hardware-specific components of the information processing device 100 will be described below.

Figure 8:
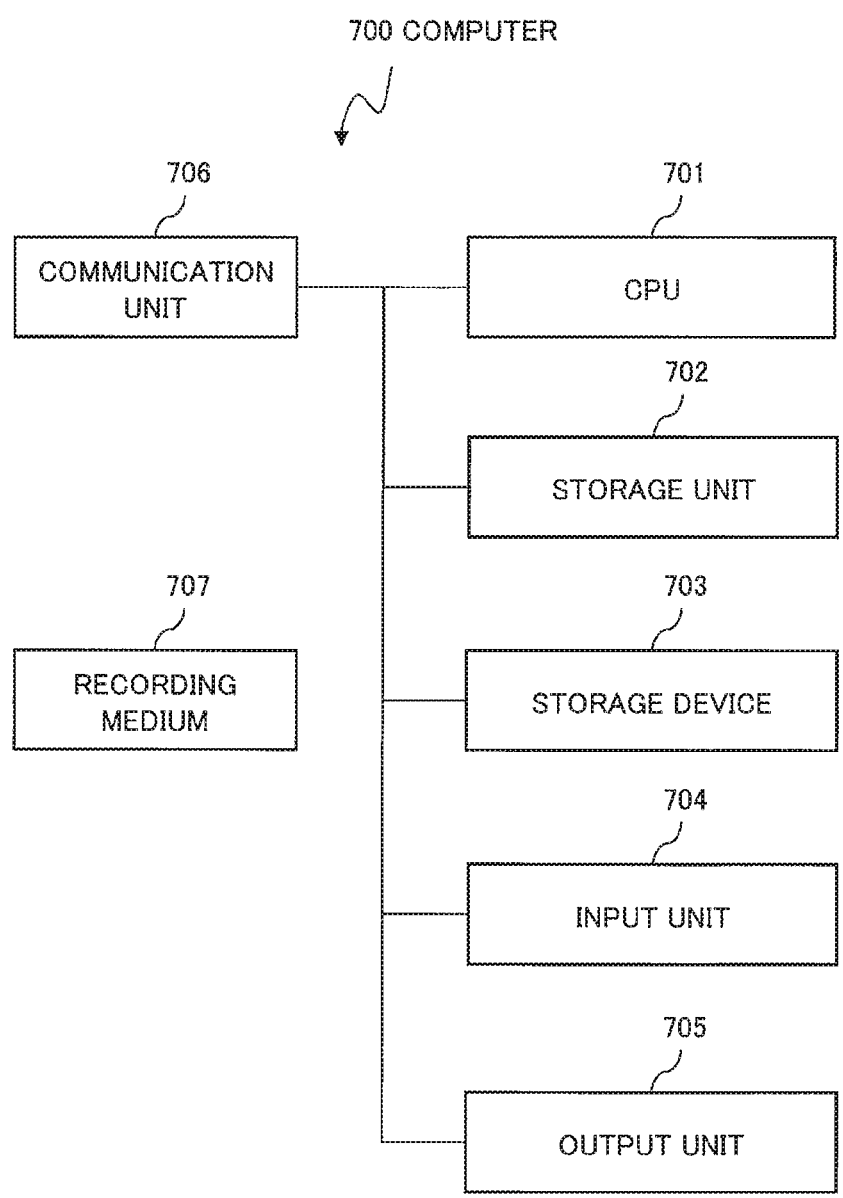
FIG. 8 is a block diagram illustrating the hardware configuration of a computer which implements the information processing device according to the first exemplary embodiment.

FIG. 8 is a view illustrating the hardware configuration of a computer 700 which implements the information processing device 100 according to the present exemplary embodiment.

The computer 700 includes a CPU (Central Processing Unit) 701, a storage unit 702, a storage device 703, an input unit 704, an output unit 705, and a communication unit 706, as illustrated in FIG. 8. The computer 700 further includes an externally supplied recording medium (or storage medium) 707. For example, the recording medium 707 is a non-volatile recording medium (non-transitory recording medium) which non-transitorily stores information. The recording medium 707 may be a transitory recording medium which holds information as a signal.

The CPU 701 runs the operating system (not illustrated) to control the operation of the overall computer 700. For example, the CPU 701 reads the program or data from the recording medium 707 mounted in the storage device 703 and writes the read program or data into the storage unit 702. Examples of the program include a program for causing the computer 700 to execute the operations in flowcharts illustrated in FIGS. 9 and 10 (to be described later).

The CPU 701 executes various types of processing as the graphing unit 110, the normal model generation unit 120, and the error detection unit 130 illustrated in FIG. 1, in accordance with the read program and the read data.

The CPU 701 may download the program or the data to the storage unit 702 from an external computer (not illustrated) connected to a communication network (not illustrated).

The storage unit 702 stores the program and the data. The storage unit 702 may store, for example, the relationship change information 810, the state graph 820, the normal model 830, and the error information 840.

The storage device 703 is implemented in, for example, any kind of an arbitrary optical disk, flexible disk, magnetooptical disk, external hard disk, or semiconductor memory, and includes the recording medium 707. The storage device 703 (recording medium 707) stores the program in a computer-readable manner. The storage device 703 may further store the data. The storage device 703 may store, for example, the relationship change information 810, the state graph 820, the normal model 830, and the error information 840.

The input unit 704 receives operator's operation input and external information input. Examples of a device used for input operations include any kind of an arbitrary mouse, keyboard, internal key button, and touch panel.

The output unit 705 is implemented in, for example, a display. The output unit 705 is used for, for example, an input request to the operator via a GUI (Graphical User Interface), and output presentation to the operator.

The communication unit 706 implements an interface with the relationship change monitoring means 930. The communication unit 706 may be included as parts of the graphing unit 110, the normal model generation unit 120, and the error detection unit 130.

Function-specific blocks of the information processing device 100 illustrated in FIG. 1 are implemented by the computer 700 having the hardware configuration illustrated in FIG. 8, as described above. Note, however, that the means for implementing each unit of the computer 700 is not limited to the foregoing description. In other words, the computer 700 may be implemented in a single physically-coupled device or two or more physically-isolated devices connected in a wired or wireless fashion.

When the recording medium 707 recording the code of the above-mentioned program is supplied to the computer 700, the CPU 701 may read and execute the program code stored in the recording medium 707. Alternatively, the CPU 701 may store in the storage unit 702 and/or the storage device 703, the program code stored in the recording medium 707. In other words, the present exemplary embodiment includes an exemplary embodiment of a recording medium 707 which transitorily or non-transitorily stores the program (software) executed by the computer 700 (CPU 701). A storage medium which non-transitorily stores information is also called a non-volatile storage medium.

Each hardware-specific component of the computer 700 implementing the information processing device 100 in the present exemplary embodiment has been described above.

Operations in the present exemplary embodiment will be described in detail below with reference to the drawings.

Figure 9:
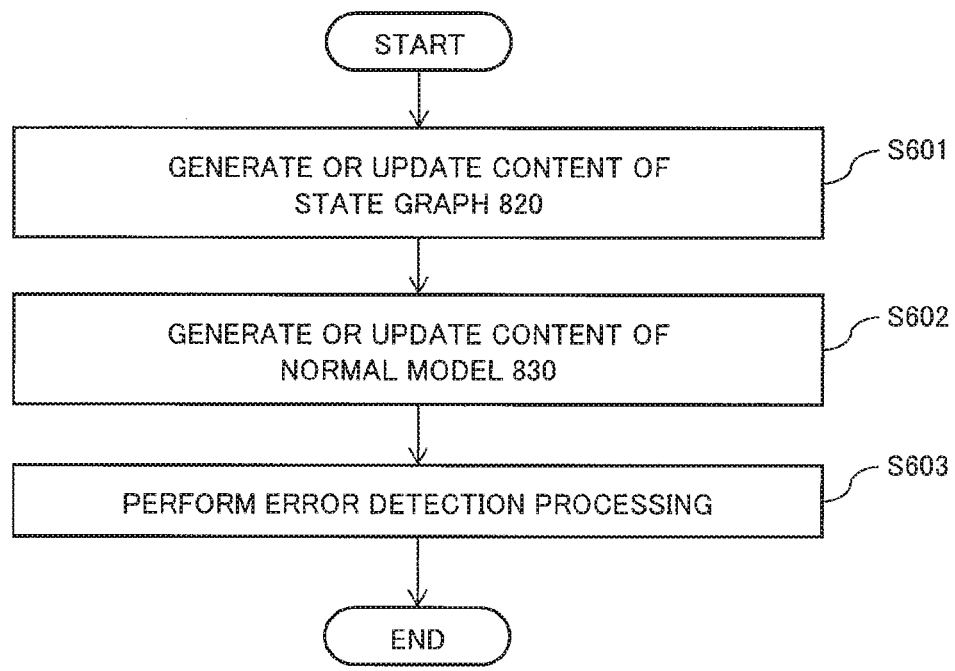
FIG. 9 is a flowchart illustrating the operation of the information processing device in the first exemplary embodiment.
Figure 10:
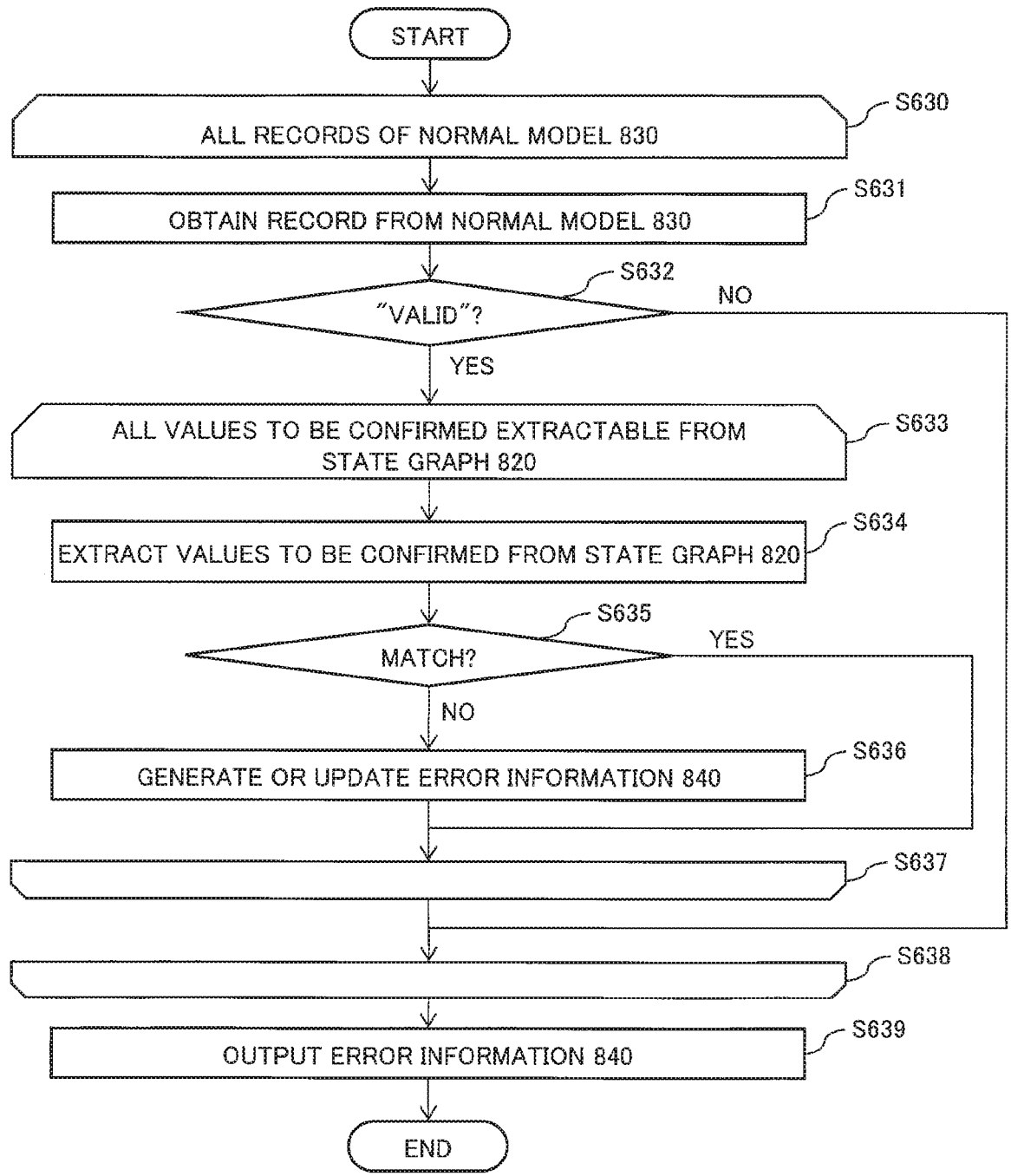
FIG. 10 is a flowchart illustrating the operation of the information processing device in the first exemplary embodiment.

FIGS. 9 and 10 are flowcharts illustrating operations in the present exemplary embodiment. Processing based on the flowcharts may be executed on the basis of program control by the CPU 701 mentioned earlier. Processing steps are denoted by symbols, such as S610.

The graphing unit 110 starts its operation according to the flowchart illustrated in FIG. 9, upon receiving relationship change information 810. The graphing unit 110, for example, receives relationship change information 810 from the system to be monitored 900 via the communication unit 706 illustrated in FIG. 8.

The graphing unit 110 generates a state graph 820 (newly generates it or generates it by updating) based on the received relationship change information 810 (step S601). The graphing unit 110 holds the state graph 820 in, for example, the storage unit 702 or the storage device 703 illustrated in FIG. 8.

The normal model generation unit 120 generates a content of the normal model 830 (newly generates it or generates it by updating) based on the received relationship change information 810 (step S602). In other words, first, the normal model generation unit 120 generates or updates a condition value for a record including the type of condition associated with the received relationship change information 810. The record is the one for the normal model 830. Second, the normal model generation unit 120 changes the setting of a valid flag in the record to "Valid" when a predetermined condition (for example, a given number of times the condition value is updated) is fulfilled for the record. The normal model generation unit 120 holds the normal model 830 in, for example, the storage unit 702 or the storage device 703 illustrated in FIG. 8.

The error detection unit 130 performs detection processing of errors associated with the system to be monitored 900, on the basis of the state graph 820 and the normal model 830 (step S603). The process then ends.

In the flowchart illustrated in FIG. 9, the graphing unit 110, the normal model generation unit 120, and the error detection unit 130 operate in series in this order. However, the graphing unit 110, the normal model generation unit 120, and the error detection unit 130 may operate in parallel.

In the operation illustrated in the flowchart of FIG. 9, the error detection unit 130 performs error detection processing every time the normal model generation unit 120 updates the content of the normal model 830. However, the error detection unit 130 may perform error detection processing at a certain timing (for example, at a specific time or when an instruction is received from the administrator).

In the operation illustrated in the flowchart of FIG. 9, the graphing unit 110 and the normal model generation unit 120 update the state graph 820 and the normal model 830, respectively, every time they receive relationship change information 810. However, the graphing unit 110 and the normal model generation unit 120 may accumulate the received relationship change information 810 and generate or update the state graph 820 and the normal model 830, respectively, based on the accumulated relationship change information 810 at a specific timing. The specific timing may be, for example, immediately before the error detection unit 130 generates error information 840.

The error detection unit 130 performs the following operation in the flowchart illustrated in FIG. 10, in step S603 of FIG. 9.

The error detection unit 130 executes the processes between steps S630 and S638 for all records of the normal model 830.

The error detection unit 130 obtains a record from the normal model 830 (step S631).

The error detection unit 130 determines whether the record is valid, based on the valid flag (step S632). If the valid flag is "Invalid" (NO in step S632), the process advances to step S638.

If the valid flag is "Valid" (YES in step S632), the error detection unit 130 executes the processes between steps S633 and S637 for all values to be confirmed extractable from the state graph 820.

The error detection unit 130 extracts a value to be confirmed corresponding to the type of condition included in the record from the state graph 820 (step S634).

The error detection unit 130 determines whether the value to be confirmed conforms to a condition value included in the record (step S635).

If the value to be confirmed conforms the condition value (YES in step S635), the process advances to step S637.

If the value to be confirmed does not conform to the condition value (NO in step S635), the error detection unit 130 determines that an error has occurred, and generates or updates error information 840 to include information indicating details of the error (step S636).

If all the extractable values to be confirmed are processed, the process advances to step S638. If any value to be confirmed remains to be processed, the process returns to step S634 (step S637).

If all records of the normal model 830 are processed, the process advances to step S639. If any record remains to be processed, the process returns to step S631 (step S638).

The error detection unit 130 outputs the error information 840 (step S639).

For example, the error detection unit 130 outputs the error information 840 via the output unit 705 illustrated in FIG. 8. The error detection unit 130 may send the error information 840 to a device (not illustrated) via the communication unit 706 illustrated in FIG. 8. The error detection unit 130 may record the error information 840 on the recording medium 707 via the storage device 703 illustrated in FIG. 8.

Next, a series of processes from the reception of the relationship change information 810 to the output of the error information 840 will be described below with reference to specific data.

Figure 11:
FIG. 11 is a view illustrating exemplary relationship change information in the first exemplary embodiment.

The graphing unit 110 starts its operation according to the flowchart illustrated in FIG. 9, upon receiving, for example, relationship change information 811 as illustrated in FIG. 11. FIG. 11 illustrates a specific example of the relationship change information 810, which indicates that the relationship "L0" has occurred between the element 920 "E3" and the element 920 "E4."

In step S601 of FIG. 9, the graphing unit 110 updates the state graph 820 (for example, from the state graph 821 illustrated in FIG. 4 to a state graph 821 illustrated in FIG. 12) based on the received relationship change information 811 illustrated in FIG. 11.

In step S602 of FIG. 9, the normal model generation unit 120 updates the content of the normal model 830 (for example, the normal model 831 illustrated in FIG. 6) based on the received relationship change information 811. In this case, however, it is unnecessary to update the content of the normal model 830 (for example, the normal model 831).

In step S631 of FIG. 10, the error detection unit 130 extracts a record having the type of condition "Number of Relationship Vertices" from the normal model 830 (for example, the normal model 831).

In step S632 of FIG. 10, the error detection unit 130 determines that the valid flag of the record is "Valid."

Figure 12:
FIG. 12 is a view illustrating another exemplary state graph in the first exemplary embodiment.

In step S634 of FIG. 10, the error detection unit 130 sequentially extracts values to be confirmed from the state graph 820 (for example, the state graph 821 illustrated in FIG. 12).

In step S635 of FIG. 10, the error detection unit 130 sequentially determines whether the values to be confirmed conform to a condition value (upper limit 2) included in the record. In this case, the error detection unit 130 determines that the number of elements 920 (that is, the number of vertex relationships) to be linked through sides to a record having the vertex identifier "E4" is "3," which does not conform to "upper limit 2."

In step S636 of FIG. 10, the error detection unit 130 generates error information 840 (for example, error information 841 illustrated in FIG. 7) indicating that the number of vertex relationships has exceeded its upper limit.

The error detection unit 130 even processes records having the types of conditions "Number of Sides" and "Side Attribute." In this case, however, no information is added to the error information 840 (for example, the error information 841) for records having the types of conditions "Number of Sides" and "Side Attribute."

In step S639 of FIG. 10, the error detection unit 130 outputs the error information 840 (for example, the error information 841 illustrated in FIG. 7).

As an advantageous effect in the above-mentioned present exemplary embodiment, the detectability of system errors may be improved. For example, system errors resulting from unknown target-type attacks may be detected.

This is because the following configuration is incorporated. First, the graphing unit 110 generates the state graph 820 based on the relationship change information 810. Second, the normal model generation unit 120 generates the normal model 830 based on the relationship change information 810. Third, the error detection unit 130 generates error information 840 based on the state graph 820 and the normal model 830.

Second Exemplary Embodiment

A second exemplary embodiment of the present invention will be described in detail below with reference to the drawings. A description of details which are the same as in the foregoing description will be omitted hereinafter within the range in which an explanation of the present exemplary embodiment does not become unclear.

Figure 13:
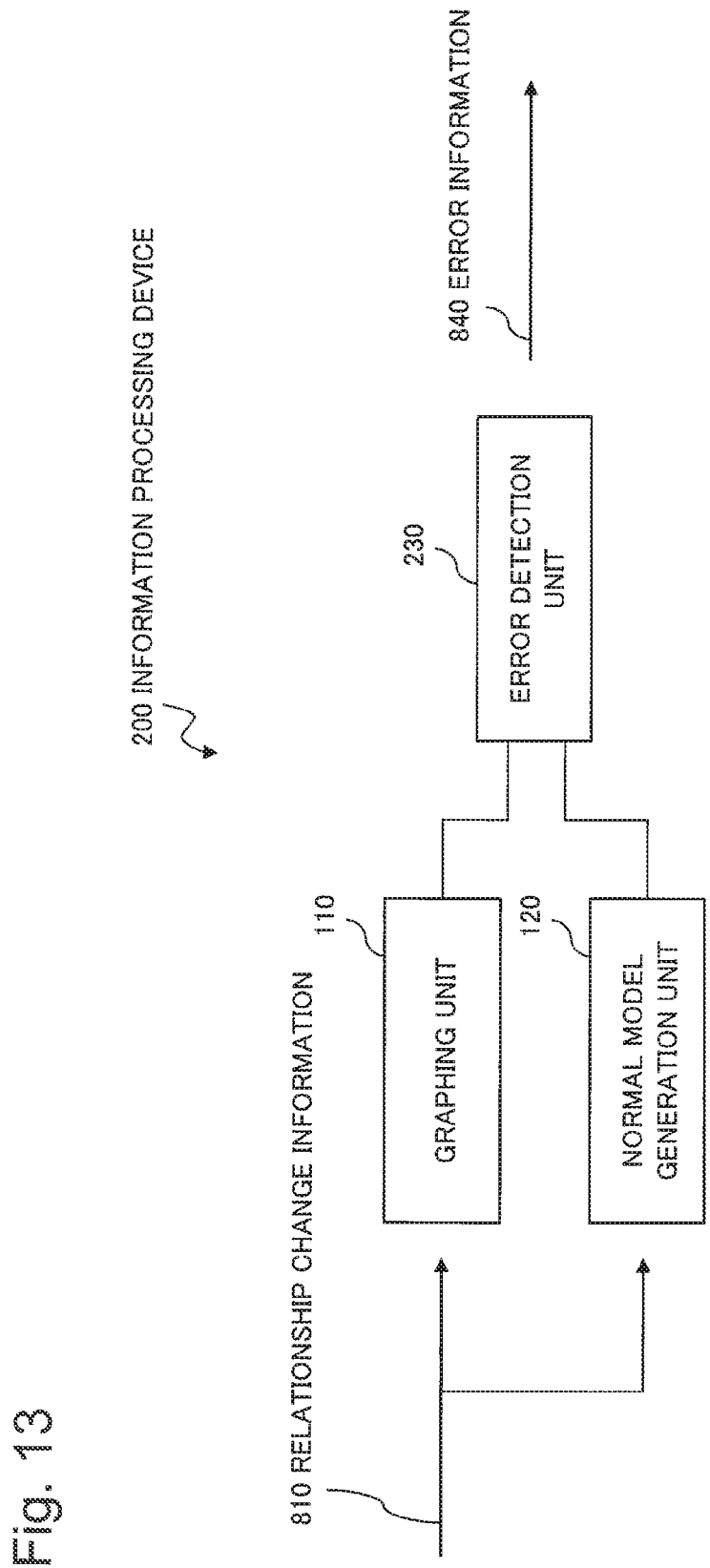
FIG. 13 is a block diagram illustrating the configuration of an information processing device according to a second exemplary embodiment of the present invention.

FIG. 13 is a block diagram illustrating the configuration of an information processing device 200 according to the second exemplary embodiment of the present invention.

The information processing device 200 in the present exemplary embodiment is different from the information processing device 100 in the first exemplary embodiment in that the former includes an error detection unit 230 in place of the error detection unit 130, as illustrated in FIG. 13.

===Error Detection Unit 230===

The error detection unit 230 calculates an error level indicating the degree of deviation of the state graph 820 from the normal model 830, associated with the detected error, and outputs error information 840 including the error level.

The error detection unit 230 is the same as the error detection unit 130 illustrated in FIG. 1 except for the aforementioned respect.

For example, based on the normal model 831 illustrated in FIG. 6 and the state graph 821 illustrated in FIG. 12, the error detection unit 230 outputs error information 840 indicating that the value to be confirmed "3" represents a deviation of 50% with respect to the condition value (upper limit "2") included in the record.

Figure 14:
FIG. 14 is a view illustrating exemplary error information in the second exemplary embodiment.

FIG. 14 is a view illustrating exemplary error information 842 as a specific example of the error information 840 output from the error detection unit 230.

As a first advantageous effect in the above-mentioned present exemplary embodiment, the detection results of system errors may be presented in more detail to the user, in addition to the advantageous effect of the first exemplary embodiment.

This is because the error detection unit 230 outputs error information 840 including the error level.

Third Exemplary Embodiment

A third exemplary embodiment of the present invention will be described in detail below with reference to the drawings. A description of details which are the same as in the foregoing description will be omitted hereinafter within the range in which an explanation of the present exemplary embodiment does not become unclear.

Figure 15:
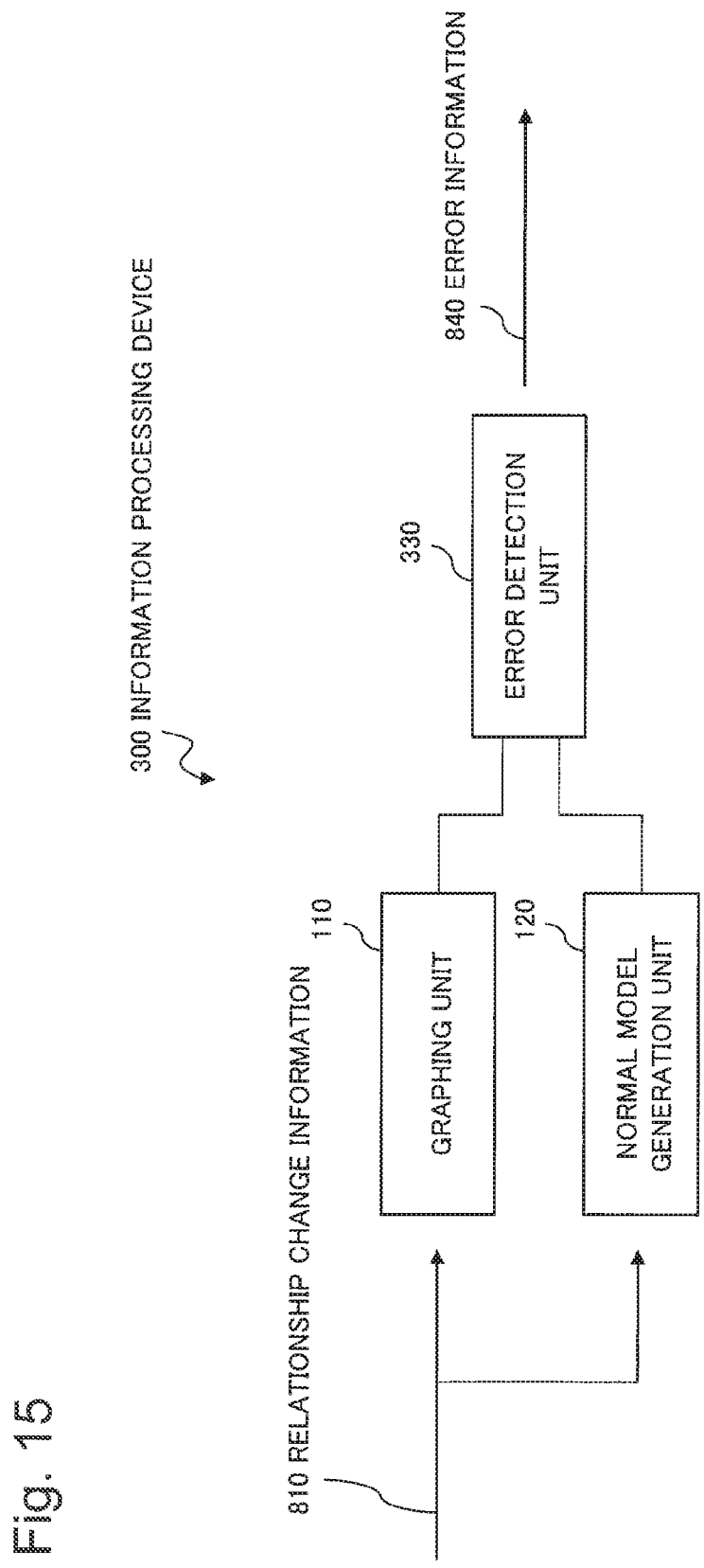
FIG. 15 is a block diagram illustrating the configuration of an information processing device according to a third exemplary embodiment of the present invention.

FIG. 15 is a block diagram illustrating the configuration of an information processing device 300 according to the third exemplary embodiment of the present invention.

The information processing device 300 in the present exemplary embodiment is different from the information processing device 100 in the first exemplary embodiment in that the former includes an error detection unit 330 in place of the error detection unit 130, as illustrated in FIG. 15.

===Error Detection Unit 330===

The error detection unit 330 outputs error information 840 including information indicating a vertex (element 920) and a side (a relationship between elements 920), associated with the detected error.

The error detection unit 330 is the same as the error detection unit 130 illustrated in FIG. 1 except for the aforementioned respect.

For example, based on the normal model 831 illustrated in FIG. 6 and the state graph 821 illustrated in FIG. 12, the error detection unit 330 outputs error information 840 including the identifier "E3" of a vertex whose number of relationship vertices has exceeded its upper limit, and the identifiers "E1," "E2," and "E3" of the relationship vertices.

Figure 16:
FIG. 16 is a view illustrating exemplary error information in the third exemplary embodiment.

FIG. 16 is a view illustrating exemplary error information 843 as a specific example of the error information 840 output from the error detection unit 330.

The error detection unit 330 may include the function of the error detection unit 230 according to the second exemplary embodiment. In this case, the error detection unit 330 including the function of the error detection unit 230 may calculate an error level for respective freely-selected side and vertex associated with the detected error.

As a first advantageous effect in the above-mentioned present exemplary embodiment, the detection results of system errors may be presented in more detail to the user, in addition to the advantageous effect of the first exemplary embodiment.

This is because the error detection unit 330 outputs error information 840 including information indicating a vertex and a side associated with the detected error. When, for example, an error of one computer A is detected, the error detection unit 330 outputs "computer A has an error in communication with computer B" as error information 840. In other words, compared to the case where only "computer A has an error" is output, the detailed fact that an internal part of computer A associated with communication with computer B has an error may be known.

Fourth Exemplary Embodiment

A fourth exemplary embodiment of the present invention will be described in detail below with reference to the drawings. A description of details which are the same as in the foregoing description will be omitted hereinafter within the range in which an explanation of the present exemplary embodiment does not become unclear.

Figure 17:
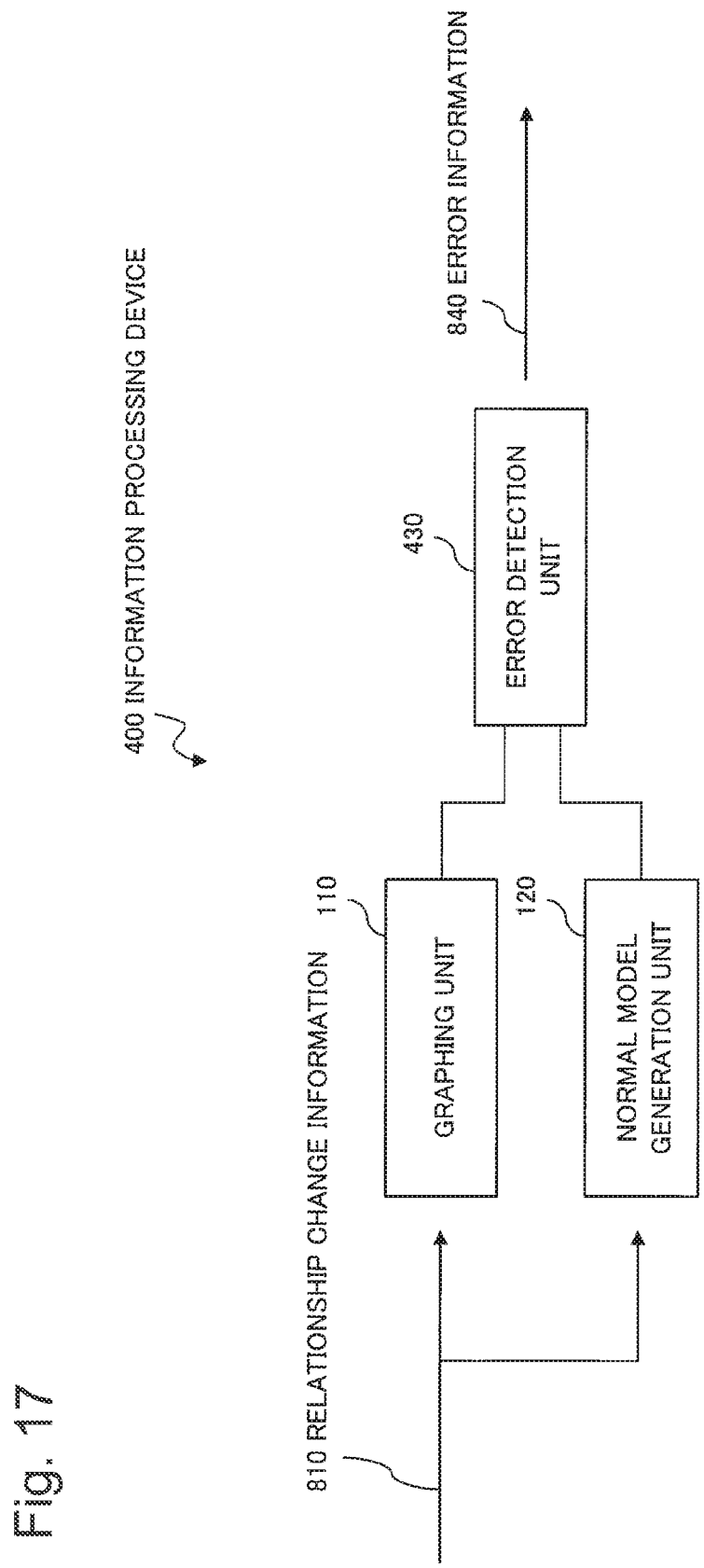
FIG. 17 is a block diagram illustrating the configuration of an information processing device according to a fourth exemplary embodiment of the present invention.

FIG. 17 is a block diagram illustrating the configuration of an information processing device 400 according to the fourth exemplary embodiment of the present invention.

The information processing device 400 in the present exemplary embodiment is different from the information processing device 100 in the first exemplary embodiment in that the former includes an error detection unit 430 in place of the error detection unit 130, as illustrated in FIG. 17.

===Error Detection Unit 430===

The error detection unit 430 outputs error information 840 generated based on the state graph 820 and the normal model 830 and including a diagram for representing an error. The diagram for representing an error includes a network diagram (to be described later in more detail), a matrix (to be described later in more detail), and other arbitrary diagrams.

The error detection unit 430 outputs error information 840 indicating an error in the following way. The error detection unit 430, for example, represents a geometric line, a character, or the like with increased line width in a portion corresponding to an error on the state graph 820. The error detection unit 430 may also represent a geometric line, a character, or the like with increased size in a portion corresponding to an error on the state graph 820. The error detection unit 430 may even display a geometric line, a character, or the like with its color changed in a portion corresponding to an error on the state graph 820. The error detection unit 430 may even display a geometric line, a character, or the like with its background color changed in a portion corresponding to an error on the state graph 820.

The error detection unit 430 may highlight a portion corresponding to an error on the state graph 820, in accordance with the arrangement of geometries, characters, or matrix cells in the error information 840. More specifically, the error detection unit 430 may localize geometries in a portion corresponding to an error on the state graph 820, in a predetermined region of the network diagram (for example, on the left or near the center of the network diagram). Further, the error detection unit 430 may generate a matrix by list sorting such that cells corresponding to an error on the state graph 820 are arranged in a predetermined order (for example, in the order starting from the leftmost column and the uppermost row) within the matrix.

The error detection unit 430 may highlight a portion corresponding to an error on the state graph 820 using any technique and output error information 840 indicating an error, regardless of the above-mentioned examples.

The error detection unit 430 may further output a diagram based on a normal model (to be referred to as a normal model diagram hereinafter). For example, the error detection unit 430 outputs a normal model diagram to allow the user to compare and refer to the normal model diagram and a diagram for representing an error. The error detection unit 430 may output the normal model diagram independently or by including it in the error information 840.

The error detection unit 430 may generate a normal model diagram based on, for example, the normal model 830 generated by the normal model generation unit 120.

The error detection unit 430 may obtain a normal model diagram generated by the normal model generation unit 120. In this case, the normal model generation unit 120 generates a normal model diagram from the normal model 830 based on, for example, a request from the error detection unit 430 and outputs it.

The normal model generation unit 120 may, for example, transfer the normal model 830 to a graphing unit 110 and request it to generate a normal model diagram, on the basis of a request from the error detection unit 430. The normal model diagram generated by the graphing unit 110 or the normal model generation unit 120 may be output directly or via the error detection unit 430.

A normal model diagram may be generated by the error detection unit 430 or the normal model generation unit 120 in accordance with, for example, the following procedure. As a first process in the procedure, all combinations of vertices (relationships between elements 920) are checked against the normal model 830 to extract combinations of vertices determined to be normal. As a second process in the procedure, the extracted combinations of vertices are included in a normal model diagram.

The error detection unit 430 is to the same as the error detection unit 130 illustrated in FIG. 1 except for the aforementioned respect.

An example of the error information 840 output from the error detection unit 430 based on the normal model 831 illustrated in FIG. 6 and the state graph 821 illustrated in FIG. 12 will be given below.

Figure 18:
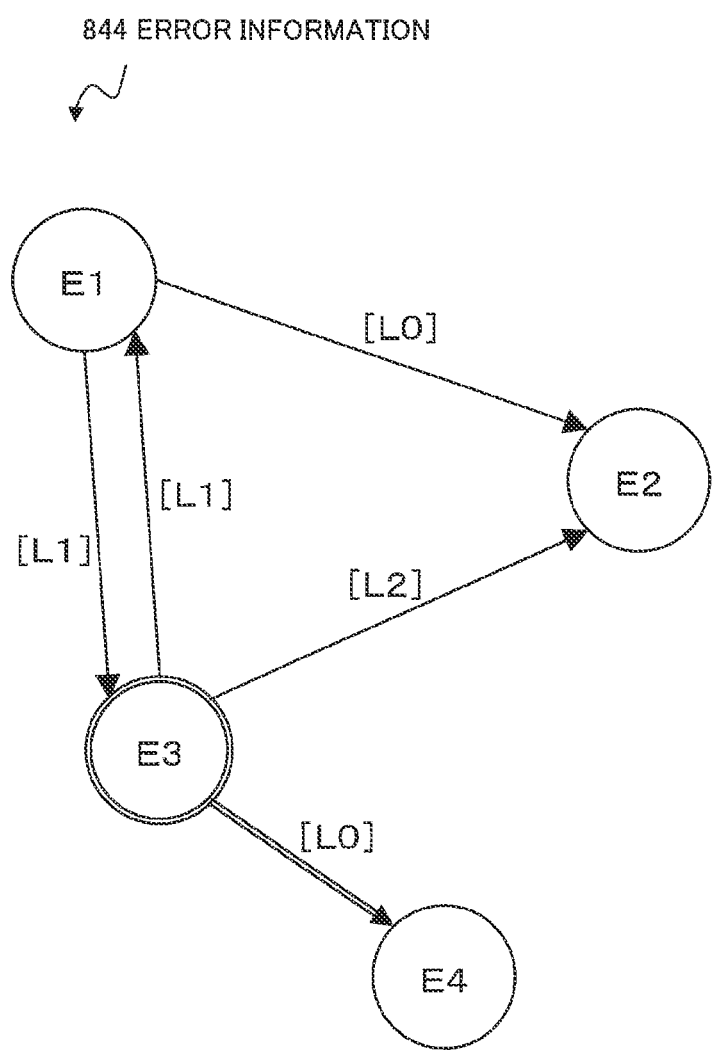
FIG. 18 is a view illustrating exemplary error information in the fourth exemplary embodiment.

FIG. 18 is a view illustrating exemplary error information 844 represented in a network diagram as a specific example of the error information 840 output from the error detection unit 430.

Referring to FIG. 18, circles represent vertices and character strings marked within the circles represent vertex identifiers. Line segments which connect the circles to each other represent sides. For example, a double circle and a double line segment highlight a vertex (element 920) and a side (a relationship between elements 920) determined to have an error.

The network diagram may be of an arbitrary type and represent an error in an arbitrary form without limitation to the example illustrated in FIG. 18.

Figure 19:
FIG. 19 is a view illustrating another exemplary error information in the fourth exemplary embodiment.

FIG. 19 is a view illustrating exemplary error information 845 represented in a matrix as a specific example of the error information 840 output from the error detection unit 430.

The error information 845 is a matrix having vertices specified by a list of vertex identifiers on the vertical axis (leftmost vertex identifiers) as its FROM (start)-side vertices of the sides, and vertices specified by a list of vertex identifiers on the horizontal axis (vertex identifiers on the top row) as its TO (end)-side vertices of the sides. Character strings (for example, "L0") in the cells of the matrix represent the presence or absence of sides (NL: the absence of sides, others: the presence of sides) from the FROM-side vertices to the TO-side vertices and attributes (L0, L1, and L2). Referring to FIG. 19, a vertex and a side associated with an error are indicated by italic characters.

The matrix may be of an arbitrary type and represent an error in an arbitrary form regardless of the example illustrated in FIG. 19.

The error detection unit 430 may output an arbitrary error diagram obtained by representing an error in an arbitrary type of diagram using any technique, and an arbitrary type of normal diagram generated on the basis of the normal model 830, freely in combination with each other or independently as the error information 840, regardless of the above-mentioned examples. For example, the error detection unit 430 may output the error diagram superimposed with a normal model diagram.

The error detection unit 430 may include the functions of the error detection unit 230 according to the second exemplary embodiment and the error detection unit 330 according to the third exemplary embodiment.

<<<Exemplary Modification to Fourth Exemplary Embodiment>>>

The error detection unit 430 may output display information indicating respective temporal changes in state graph 820, normal model 830, and error information 840, independently or in association with each other. The temporal changes refer to changes with passage in time.

The display information may be information indicating a moving image of a change, for example, in state of any of the state graph 820, the normal model 830, and the error information 840. The display information may further be information indicating a particular arrangement of the states of any of the state graph 820, the normal model 830, and the error information 840 available at a plurality of points in time.

The display information may be updated in real time in association with the current time.

As a first advantageous effect in the above-mentioned present exemplary embodiment, the detection results of system errors may be presented to the user in a form easier for the human to understand, in addition to the advantageous effect of the first exemplary embodiment.

This is for the following reasons. The error detection unit 430 outputs error information 840 including a diagram for representing an error. The error detection unit 430 further outputs a normal model diagram. The error detection unit 430 even outputs display information indicating respective temporal changes in state graph 820, normal model 830, and error information 840.

As a second advantageous effect in the above-mentioned present exemplary embodiment, even when no error has actually occurred in the system, the interval between vertices which cause communication considered to be normal may be discriminated with that between vertices which cause communication considered to be erroneous. Further, enabling this discrimination may prevent erroneous communication by, for example, permitting communication only between vertices considered to cause normal communication to.

This is because the following configuration is incorporated. First, the error detection unit 430 or the normal model generation unit 120 checks all combinations of vertices against the normal model 830 to extract combinations of vertices determined to be normal and includes the extracted combinations of vertices in a normal model diagram. Second, the error detection unit 430 outputs a diagram for representing an error as superimposed with the normal model diagram.

Fifth Exemplary Embodiment

A fifth exemplary embodiment of the present invention will be described in detail below with reference to the drawings. A description of details which are the same as in the foregoing description will be omitted hereinafter within the range in which an explanation of the present exemplary embodiment does not become unclear.

Figure 20:
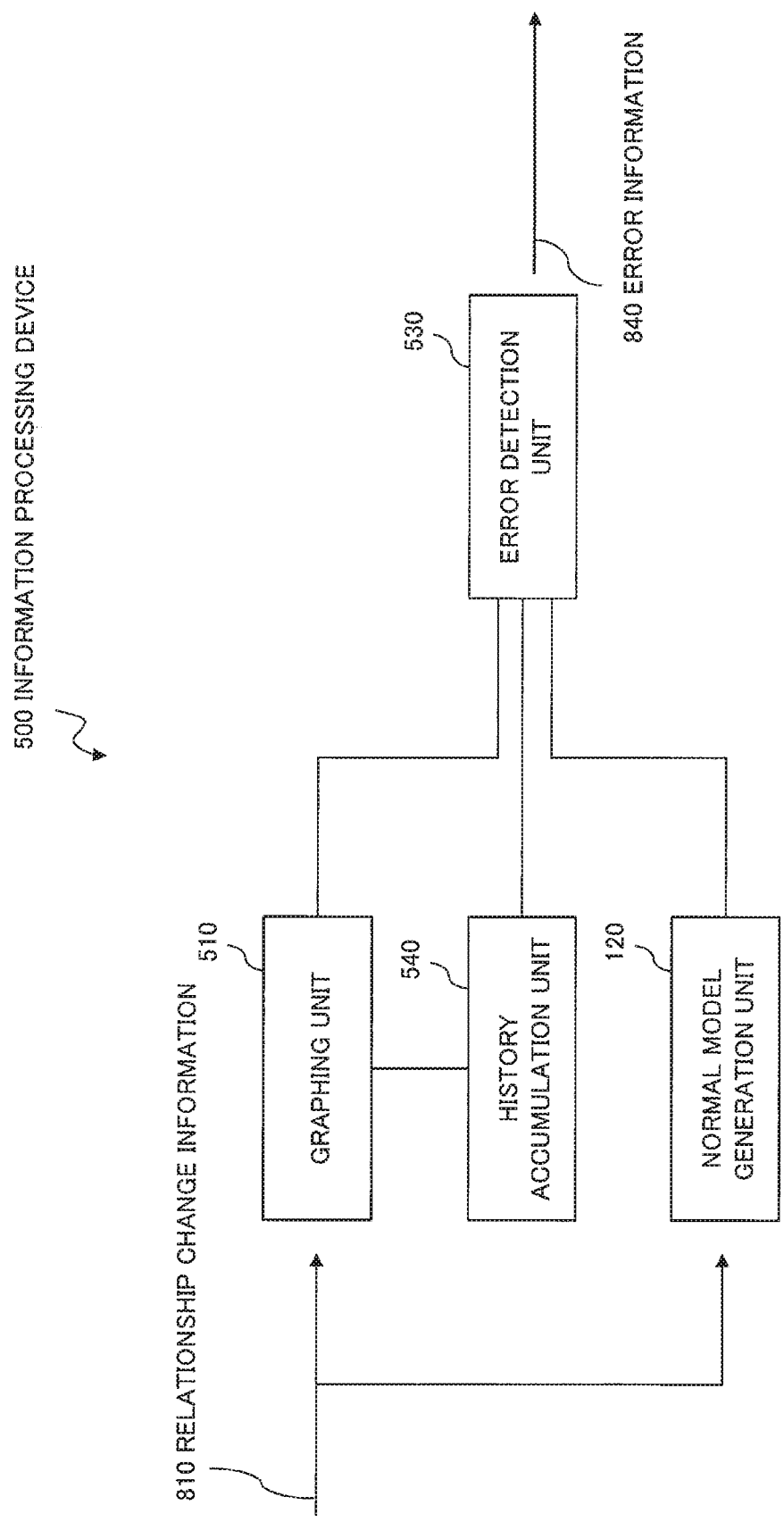
FIG. 20 is a block diagram illustrating the configuration of an information processing device according to a fifth exemplary embodiment of the present invention.

FIG. 20 is a block diagram illustrating the configuration of an information processing device 500 according to the fifth exemplary embodiment of the present invention.

The information processing device 500 in the present exemplary embodiment is different from the information processing device 100 in the first exemplary embodiment in that the former includes a graphing unit 510 in place of the graphing unit 110 and an error detection unit 530 in place of the error detection unit 130, and further includes a history accumulation unit 540, as illustrated in FIG. 20.

===Graphing Unit 510===

The graphing unit 510 records, at a predetermined timing, information capable of restoring the state graph 820 available at the point in time in the history accumulation unit 540 in association with, for example, the time of day at the point in time. Examples of the predetermined timing include a predetermined time of day. The predetermined timing may be the timing at which the number of processes of relationship change information 810 reaches a predetermined threshold. The predetermined timing may be an arbitrary timing regardless of the above-mentioned examples. Examples of the information capable of restoring the state graph 820 available at the point in time include the difference from the state graph 820 available at any previous point in time (for example, one point in time before the predetermined point in time). The information capable of restoring the state graph 820 available at the point in time may even be the state graph 820 itself available at the point in time.

The graphing unit 510 may further record the latest state graph 820 in the history accumulation unit 540 as a temporary state graph, and update the temporary state graph and its associated time of day every time relationship change information 810 is obtained. In this case, the graphing unit 510 may stop updating the temporary state graph at the predetermined timing and determine the temporary state graph as a final state graph 820.

The graphing unit 510 is the same as the graphing unit 110 illustrated in FIG. 1 except for the aforementioned respect.

===History Accumulation Unit 540===

The history accumulation unit 540 stores the state graph 820. The history accumulation unit 540 may further store the above-mentioned temporary state graph.

===Error Detection Unit 530===

The error detection unit 530 detects an error associated with a system to be monitored 900 based on the normal model 830 and the state graph 820 stored in the history accumulation unit 540. The error detection unit 530 may further detect an error associated with the system to be monitored 900 on the basis of the temporary state graph stored in the history accumulation unit 540. The error detection unit 530 is equivalent to the error detection unit 130 illustrated in FIG. 1 except for the aforementioned respect.

The error detection unit 530 may include any functions of the error detection unit 130 according to the first exemplary embodiment, the error detection unit 230 according to the second exemplary embodiment, the error detection unit 330 according to the third exemplary embodiment, and the error detection unit 430 according to the fourth exemplary embodiment.

When, for example, the error detection unit 530 includes the function of the error detection unit 430, the display information in the exemplary modification to the fourth exemplary embodiment may be associated with the required time range.

As an advantageous effect in the above-mentioned present exemplary embodiment, error information 840 in the past state graph 820 with respect to the current normal model 830 may be provided to the user, in addition to the advantageous effect of the first exemplary embodiment.

This is because the following configuration is incorporated. First, the graphing unit 510 records the state graph 820 in the history accumulation unit 540 at a predetermined timing, and the history accumulation unit 540 stores the state graph 820. Second, the error detection unit 530 detects an error associated with the system to be monitored 900 based on the normal model 830 and the state graph 820 stored in the history accumulation unit 540.

Although the present invention has been described above with reference to each exemplary embodiment, the present invention is not limited to the above-described exemplary embodiments. Various changes which would be understood by those skilled in the art may be made to the configurations or details of the present invention within the scope of the present invention.

This application claims priority based on Japanese Patent Application No. 2014-058497 filed on Mar. 20, 2014 and PCT International Application No. PCT/JP2014/003007 filed on Jun. 5, 2014, the disclosure of which is incorporated herein by reference in their entirety.

REFERENCE SIGNS LIST 100 information processing device
110 graphing unit
120 normal model generation unit
130 error detection unit
200 information processing device
230 error detection unit
300 information processing device
330 error detection unit
400 information processing device
430 error detection unit
500 information processing device
510 graphing unit
530 error detection unit
540 history accumulation unit
700 computer
701 CPU
702 storage unit
703 storage device
704 input unit
705 output unit
706 communication unit
707 recording medium
810 relationship change information
811 relationship change information
820 state graph
821 state graph
830 normal model
831 normal model
840 error information
841 error information
842 error information
843 error information
844 error information
845 error information
900 system to be monitored
920 element
930 relationship change monitoring means

The invention claimed is:

1. An information processing device comprising:
an interface configured to receive relationship change information from a relationship change monitor monitoring a system, the system including a plurality of elements and the relationship change information indicating a change between the plurality of elements;

a memory storing a program; and a processor reading the program from the memory and, in accordance with the program, being configured to:

receive relationship change information of a system from the relationship change monitor;

input the relationship change information from the relationship change monitor via the interface;

generate a state graph based on the relationship change information, the relationship change information being obtained on a time-series basis, the state graph including the elements as vertices thereof and the relationship between the elements as sides thereof;

generate a normal model including the state graph as a set of conditions to be fulfilled during normal operation of the system based on the relationship change information, wherein the normal model is defined by a record including a type of condition, a condition value, and a valid flag;

detect, based on the state graph and the normal model, an error associated with the system and resulting from an unknown target-type attack; and output, to at least one of a display, another device, and a recording medium, first error information indicating the detected error to prevent the unknown target-type attack, wherein the detected error associated with the system is detected by determining whether a value to be confirmed is extractable from the state graph and determining whether the value to be confirmed conforms to the condition value included in the record.

2. The information processing device according to claim 1, wherein the system includes a plurality of hosts connected to each other via a network, and processes running on the hosts are defined by the vertices.

3. The information processing device according to claim 1, wherein the detected error includes an error level indicating a degree of deviation of the state graph from the normal model associated with the detected error, and outputs the first error information including at least the error level.

4. The information processing device according to claim 1, wherein the processor is configured to output the first error information including at least information for identifying the element and information concerning the relationship between the elements associated with the detected error.

5. The information processing device according to claim 1, wherein the processor is configured to output second error information including a diagram for representing an error generated based on the state graph and the first error information.

6. The information processing device according to claim 5, wherein the processor is configured to extract a relationship between the elements considered to be normal by checking against the normal model among all relationships between the elements, and outputs a diagram for representing the error as superimposed with the extracted relationship between the elements.

7. The information processing device according to claim 5, wherein the processor is configured to output display information indicating respective temporal changes in the state graph, the normal model, and the second error information, independently or in association with each other.

8. The information processing device according to claim 1, the processor further configured to:

store a historical state graph in the memory, wherein the processor is configured to record the historical state graph, and the processor further detects an error associated with the system based on the normal model and the historical state graph.

9. The information processing device according to claim 1, wherein the relationship change information includes information indicating at least one of occurrence, disappearance, and change of a relationship between the elements, and occurrence and disappearance of an element.

10. The information processing device according to claim 1, wherein the conditions in the normal model include a range of at least one of an attribute of any of the vertices, the number of vertices adjacent to any of the vertices, attributes of the vertices adjacent to any of the vertices, attributes of the sides, one of presence and absence of routes between the vertices, the number of routes between the vertices, distances of the routes, attributes of the vertices in the routes, attributes of the sides in the routes, and a characteristic of the state graph.

11. An information processing system comprising:

the information processing device according to claim 1; and a relationship change monitor configured to monitor the system and send relationship change information.

12. An error detection method comprising:

receiving, from a relationship change monitor monitoring a system, relationship change information of the system, the system including a plurality of elements and the relationship change information indicating a change between the plurality of elements;

generating, by a processor, a state graph based on the relationship change information, the relationship change information being obtained on a time-series basis, and the state graph including the elements as vertices thereof and the relationship between the elements as sides thereof;

generating, by the processor, a normal model including the state graph as a set of conditions to be fulfilled during normal operation of the system, based on the relationship change information, wherein the normal model is defined by a record including a type of condition, a condition value, and a valid flag;

detecting, by the processor, based on the state graph and the normal model, an error associated with the system and resulting from an unknown target-type attack, including:

determining whether a value to be confirmed is extractable from the state graph, and determining whether the value to be confirmed conforms to the condition value included in the record; and outputting, to at least one of a display, another device, and a recording medium, error information indicating the detected error to prevent the unknown target-type attack.

13. A non-transitory computer-readable recording medium recording a program for causing a processor to execute the processes of:

receiving relationship change information of a system detected by a relationship change monitor monitoring a system, the system including a plurality of elements and the relationship change information indicating a change between the plurality of elements;

generating a state graph based on the relationship change information, the relationship change information being obtained on a time-series basis, and the state graph including the elements as vertices thereof and the relationship between the elements as sides thereof;

generating a normal model including the state graph as a set of conditions to be fulfilled during normal operation of the system based on the relationship change information, wherein the normal model is defined by a record including a type of condition, a condition value, and a valid flag;

detecting, based on the state graph and the normal model, an error associated with the system and resulting from an unknown target-type attack, including:
  determining whether a value to be confirmed is extractable from the state graph, and
  determining whether the value to be confirmed conforms to the condition value included in the record; and outputting, to at least one of a display, another device, and a recording medium, error information indicating the detected error to prevent the unknown target-type attack.

\* \* \* \* \*